United States Patent [19]
Omi

[11] Patent Number: 5,092,716
[45] Date of Patent: Mar. 3, 1992

[54] DRILL AND METHOD FOR USING THE SAME

[75] Inventor: Shohei Omi, Anjo, Japan

[73] Assignee: Omi Kogyo Co., Ltd., Anjo, Japan

[21] Appl. No.: 616,318

[22] Filed: Nov. 21, 1990

[30] Foreign Application Priority Data

Nov. 25, 1989 [JP] Japan .................. 1-136154
Aug. 20, 1990 [JP] Japan .................. 2-219625

[51] Int. Cl.$^5$ .................................. B23B 51/04
[52] U.S. Cl. .................................. 408/59; 408/204
[58] Field of Search .............. 408/56, 57, 58, 59, 408/204, 207, 703, 67; 175/215, 330, 380

[56] References Cited

U.S. PATENT DOCUMENTS

| | | | |
|---|---|---|---|
| 1,281,420 | 10/1918 | Reid | 408/59 |
| 1,826,625 | 10/1931 | Masters | 408/59 |
| 3,304,815 | 2/1967 | Faber | 408/59 |
| 4,591,300 | 5/1986 | Weiblen et al. | 408/59 |

FOREIGN PATENT DOCUMENTS

| | | | |
|---|---|---|---|
| 55458 | 3/1891 | Fed. Rep. of Germany | 175/380 |
| 417255 | 10/1974 | U.S.S.R. | 408/59 |
| 666004 | 6/1979 | U.S.S.R. | 408/59 |
| 891233 | 12/1981 | U.S.S.R. | 408/59 |

*Primary Examiner*—Daniel W. Howell
*Attorney, Agent, or Firm*—Reinhart, Boerner, Van Deuren, Norris & Rieselbach

[57] ABSTRACT

A design of a drill and a method for using the same are disclosed. A groove is formed on the outer periphery of an adapter which is connected to the electric motor. A fluid supply line is also formed on the adapter so as to lead fluid to the groove. Openings are provided at a proximal end of a shank, adjacent to the groove. Guide flutes extending from the openings to a tip of the shank are formed at an outer periphery of the shank so as to define passages for leading the fluid introduced from the openings to the tip of the shank to be sprayed upon the cutting debris. Exhaust ports for discharging the debris and exhaust passages for leading the debris through the shank to the exhaust ports are provided at the adapter. The guide flutes can be formed with milling machine or the like.

When the drill is used, the drill is pressed against a material while being rotated. Then, the fluid is introduced into the passages between the shank and a sleeve and is sprayed upon the cutting debris. A suction is applied through a central portion of the shank to remove the cutting debris. The suction is strong enough to suck granular abrasives into the drilling area from outside the drill. The abrasive effect of the abrasives promotes self sharpening of the cutting teeth.

7 Claims, 4 Drawing Sheets

DRILL AND METHOD FOR USING THE SAME

BACKGROUND OF THE INVENTION

1. Field of the Invention

The present invention relates generally to a drill and a method for using the same. More particularly, a design of drills for drillign reinforced concrete, rock or the like and a drilling method for using the same is proposed.

2. Description of the Related Art

Diamond core bits are generally known for drilling the above types of materials. Such diamond bits usually have an adapter connected to and rotating integrally with a drive shaft of an electric motor, a cylindrical body attached to the tip of the adapter, and an annular bit attached to the tip of the body. A multiplicity of diamond segments are fixed to the tip surface of the bit. There is also a type wherein the body and the bit are integrally formed. The diamond core bits having the foregoing designs can drill a desired portion of, by way of example, a reinforced concrete building and can cut a deep hole therein.

However, when a deep hole is to be made into a concrete building or the like with the foregoing diamond core bit, debris due to drilling remains around the diamond segments and increases the drilling resistance. As a result, the drilling efficiency of the diamond core bit deteriorates.

In order to solve the above problem, double cylinder type drills have been proposed. The double cylinder type drill has a body comprised of a shank and a sleeve fixed to the shank. In this type of the drill, compressed air is supplied to a passage formed between the shank and the sleeve. The compressed air is sprayed upon the debris, which is then sucked and discharged through the inside of the drill by means of an aspirator.

In the foregoing double cylinder type drill, the passage for the compressed air must be provided at the adapter and between the shank and the sleeve. However, the shape and the location of the passages in conventional double cylinder type drill tend to be inefficient and make the sleeve difficult to assemble. Therefore, conventional double cylindrical type drills require a long and complicated manufacturing process which leads to high production costs.

When the foregoing double cylindrical type drill is at work and comes into contact with a reinforcing bar for instance, there is also another problem that the self-sharpening effect of the drill bit deteriorates. The self-sharpening effect here means as follows. When abrasive grains forming the diamond segments are abraded, a higher drilling resistance comes about upon the abrasive grains. Thus, a part of the abrasive grains is broken due to the increased resistance. However, the broken part has sharpness and can work as an effective cutting edge. It is called the self sharpening effect. When the self sharpneing effect is lowered, it takes an extended time to drill and cut the reinforcing bars. In some cases, it may become impossible to drill them.

SUMMARY OF THE INVENTION

A primary object of the present invention is to provide a drill double cylinder type drill that can be manufactured simply at a low cost.

Another object of the present invention is to provide a method for drilling that allows self sharpening of the cutting teeth when the cutting edges come into contact with a hard material such as reinforcing bars, so that the reinforcing bars or the like can also be smoothly drilled or cut.

To achieve the foregoing and other objects and in accordance with the purpose of the present invention, an improved drill and a method for using the same are proposed. According to the present invention, the drill has an adapter connected to and rotating together with a drive shaft of an electric motor, a shank attached to the adapter, and a sleeve fixed to and covering the outer periphery of the shank. A plurality of cutting teeth are provided at the tip of either the shank or of the sleeve. The adapter has a groove on the periphery thereof and a fluid supply line which leads a fluid supplied from the proximal side of the adapter to the groove. The proximal portion of the shank is provided with openings adjacent the groove. In addition, guide flutes are disposed at the outer periphery of the shank, extending from the openings to the tip of the shank. The guide flutes form passages, which lead the fluid introduced through the openings to the tip of the shank to spray it upon the debris. The adapter further includes an exhaust port for discharging the debris and an exhaust passage for leading the debris through the shank to an exhaust port.

In a method aspect of the present invention the cutting teeth are pressed against a material while being rotated to cut the material. Fluid is supplied into the passage formed between the shank and the sleeve to be sprayed upon the debris caused by drilling. The debris is then sucked through a central portion of the shank. The suction is sufficiently strong to draw granular abrasives from outside of the drill into the drilling area.

BRIEF DESCRIPTION OF THE DRAWING

The features of the present invention that are believed to be novel are set forth with particularly in the appended claims. The invention, together with the objects and advantages thereof, may best be understood by reference to the following description of the presently preferred embodiments together with the accompanying drawings in which:

DETAILED DESCRIPTION OF THE PREFERRED EMBODIMENT

Figure 1:
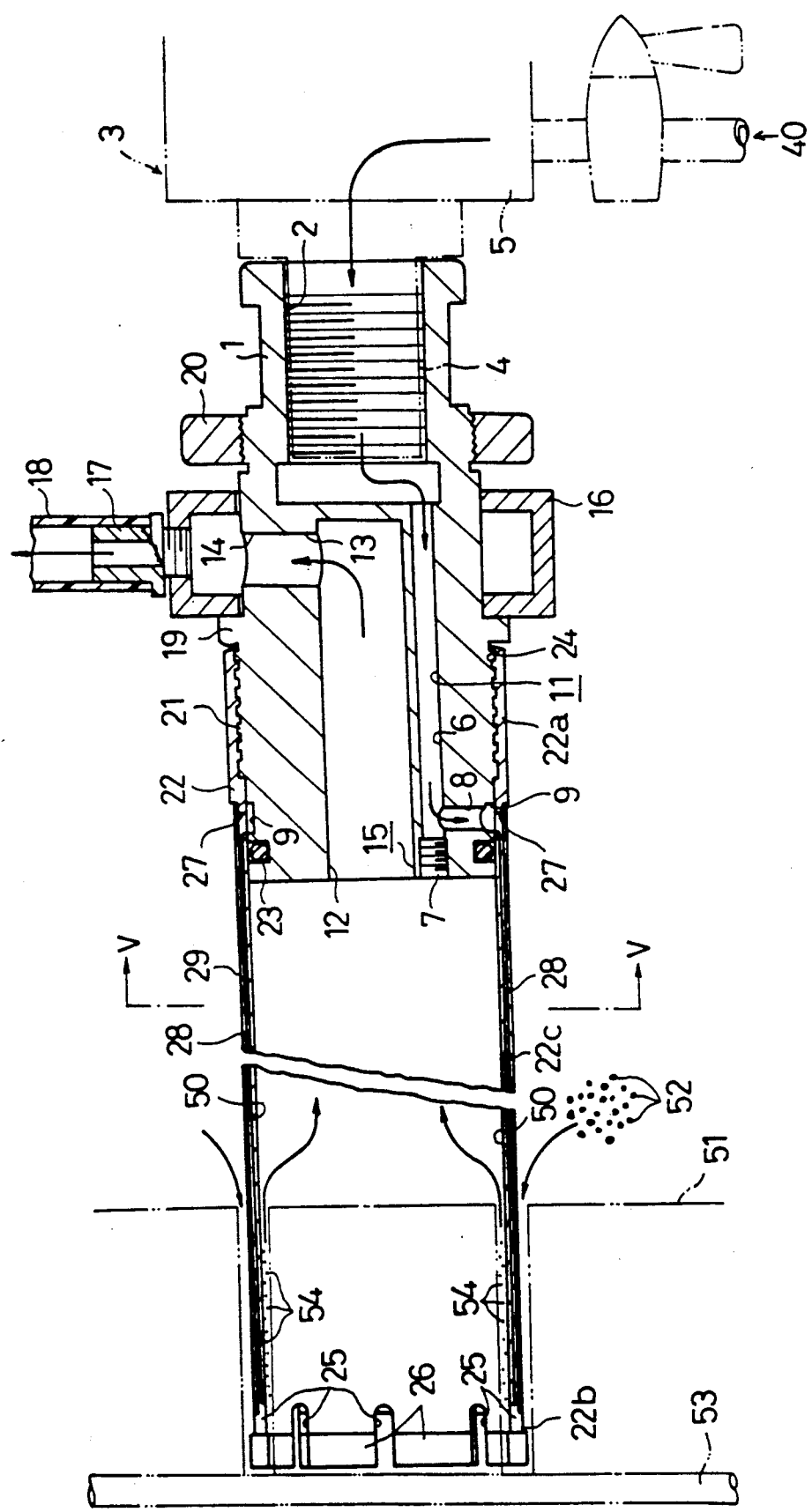
FIG. 1 is a sectional view of a drill of one embodiment of the present invention wherein one part of the shank and sleeve is omitted.

As illustrated in the drawings, a preferred embodiment of the present invention will be described in detail hereinafter.

Figure 2:
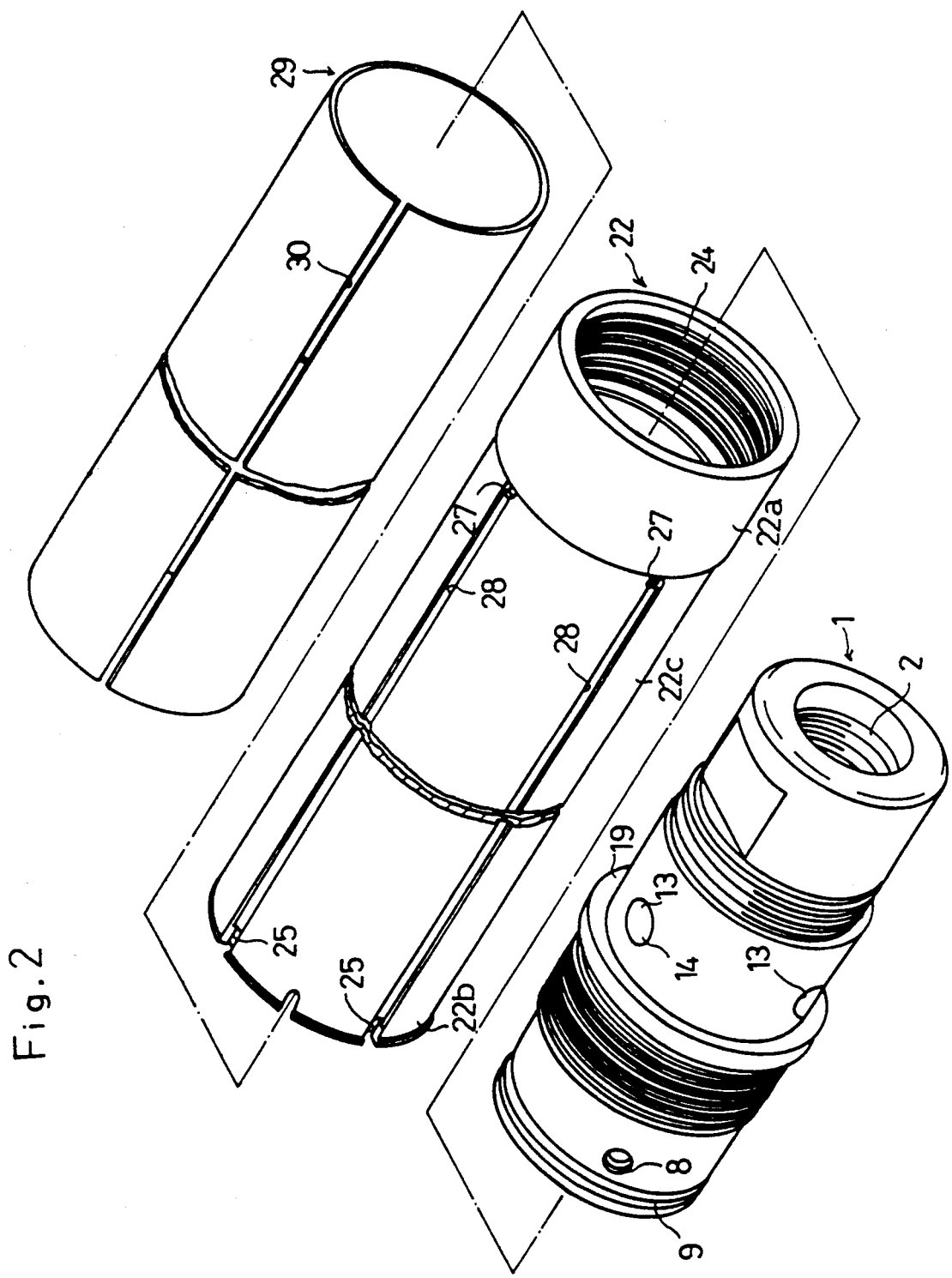
FIG. 2 is an exploded perspective view of the drill shown in FIG. 1.

As shown in FIGS. 1 and 2, the drill of the present embodiment includes an adapter 1 fitted to an electric motor 3, a shank 22 attached to the tip of the adapter 1, and a sleeve 29 covering and fixed to the outer periphery of the shank 22. A plurality of cutting teeth 26 are fixed to the tip of the shank 22. The adapter 1, the shank 22, and the sleeve 29 are integrally rotated by the motor 3. When rotated, the cutting teeth 29 can drill into a material such as a concrete 51. Each of the foregoing parts will be explained one by one below.

ADAPTER 1

A tapped hole 2 is formed in the proximal end of adapter 1 such that it opens at the adapter's a proximal surface (the right end surface in FIG. 1). A drive shaft 4 of the motor 3 is screwed into the tapped hole 2. A primary swivel joint 5 is supported on the drive shaft 4 and can rotate relative to the drive shaft 4. Compressed air 40 is supplied from the outside of the primary swivel joint 5. The compressed air is introduced throught the inside of the drive shaft 4 into the tapped hole 2.

Figure 3:
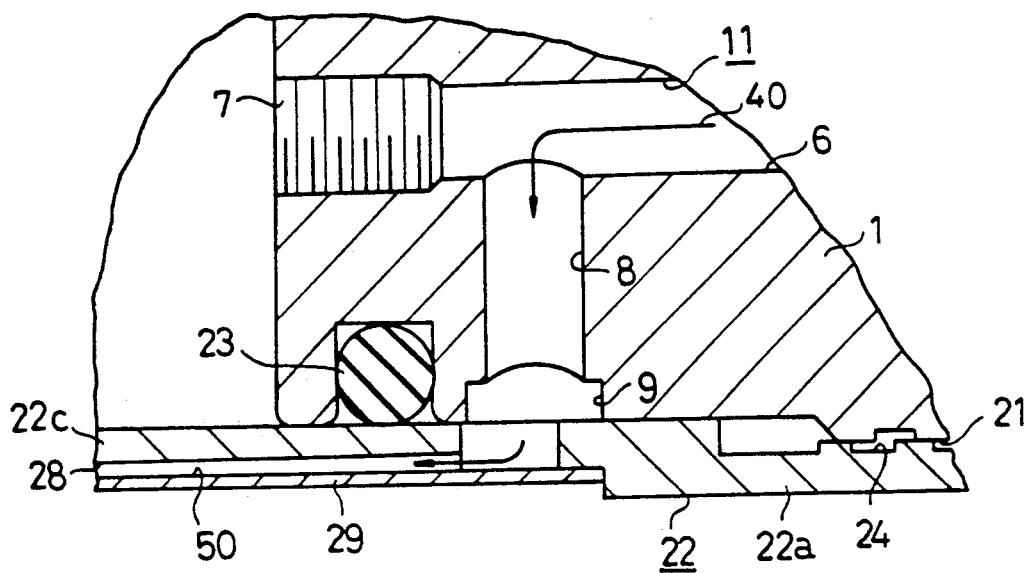
FIG. 3 is an enlarged sectional view highlighting the connection between an attachment portion of the shank and the adapter.
Figure 4:
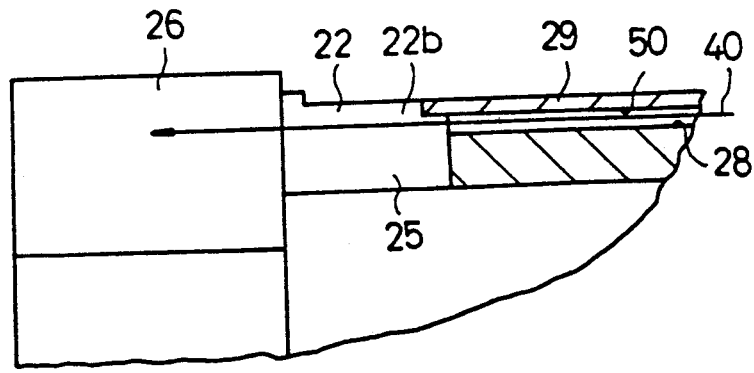
FIG. 4 is an enlarged sectional view of the tips of the shank and of the sleeve.
Figure 5:
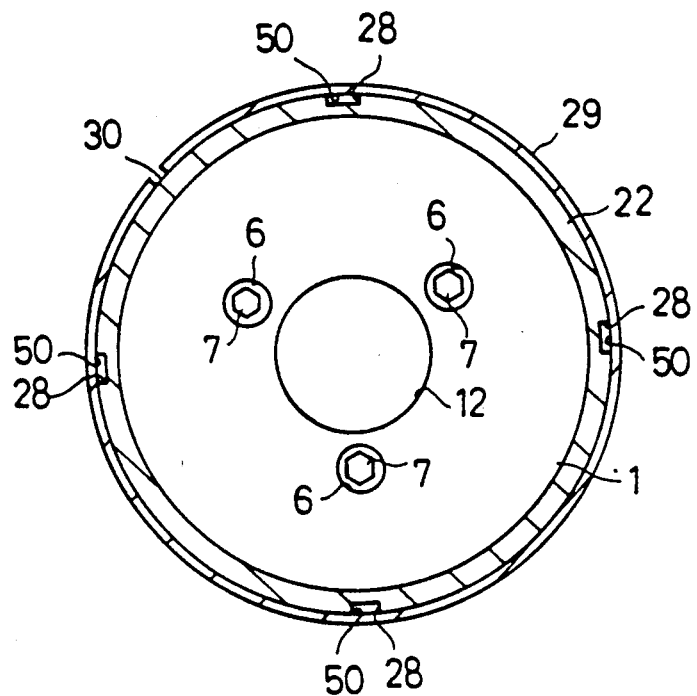
FIG. 5 is a sectional view taken along with a line V—V in FIG. 1.

A plurality (three in this embodiment, refer to FIG. 5) of small bore holes 6 are provided at an inner bottom surface of the tapped hole 2. The small bore holes are arranged having an equal angle distance around an axis of the drive shaft 4 and extend in the axial direction toward the tip of the adapter 1. The small bore holes 6 open at the tip surface of the adapter 1 and are closed by screws 7. As shown in FIGS. 1 and 3, an opening 8 is provided at each small bore hole 6 and extends outwardly in the diametrical direction of the adapter 1. The openings 8 open at a groove 9 defined at the outer periphery of the adapter 1. In this embodiment, the tapped hole 2, the small bore holes 6 and the openings 8 compose a fluid supply line 11 which leads the compressed air 40 supplied from the proximal side of the adapter 1 to the groove 9.

As shown in FIG. 1, a large bore hole 12 is defined at substantially a middle portion of the adapter 1, opening at the tip surface of the adapter 1 and extending in the axial direction toward the proximal side of the adapter 1. A plurality of (three in this embodiment) openings 13 are provided at an inner end of the large bore hole 12, having an equal angle distance between one another and extending outwardly in the diametrical direction of the adapter 1. The openings 13 open at a peripheral surface of the adapter 1 to form exhaust ports 14. In the present embodiment, the large bore hole 12 and the opening 13 compose exhaust passages 15 which lead the debris to the exhaust ports 14.

A secondary swivel joint 16 is supported on an can rotate relative to the periphery of the adapter 1. The secondary swivel joint 16 covers all of the exhaust ports 14. A suction pipe 18 is connected to the secondary swivel joint 16 by way of a connector 17. An aspirator (not shown) is connected to the suction pipe 18. Upon operation of the aspirator, the debris is sucked through the exhaust passage 15, the secondary swivel joint 16, the connector 17 and the suction pipe 18 to be discharged out of the adapter 1.

A flange 19 is formed integrally with the outer periphery of the adapter 1 near the exhaust ports 14. A stopper 20 is threadably enaged with the periphery of the adapter 1 adjacent to the proximal end of the opening 13. The flange 19 and the stopper 20 prevent the secondary swivel joint 16 from moving in the axial direction.

A male thread 21 is formed on the periphery of the adapter 1 between the flange 19 and the groove 9. A proximal portion of the shank 22 has a female thread that engages the male thread 21. The periphery of the adapter 1 has an O-ring 23 thereon at the distal side thereof relative to the groove 9 to seal the adapter 1 and the shank 22.

SHANK 22

As shown in FIGS. 1 and 2, the shank 22 is cylindrical with both ends thereof being open. A flange 22a and a weldment 22b are both formed at each end of the shank 22 having a body portion 22c therebetween. A female thread 24 to fit the male thread 21 is formed at the inner surface of the flange 22a. A plurality of (eight in the present embodiment) notches 25 are defined at the tip surface of the weldment 22b. The notches are spaced equal distances apart and extend toward the proximal side of the shank 22. A cutting tooth 26 is fixed to the tip surface of the weldment 22b between each pair of adjacent notches 25 by brazing or the like.

A plurality of (four in the present embodiment) inlet ports 24 are provided at the proximal portion of the shank 22. The inlet ports are spaced at equal intervals and communicate between the inside and the outside of the shank 22. When the shank 22 is screwed and fitted to the adapter 1, the inlet ports 24 are positioned adjacent the groove 9 of the adapter 1. Guide flutes 28 having a depth of 0.4–0.5 mm are formed on the outer periphery of the shank 22 and extend in the axial direction from the inlet ports 27 to notches 25.

SLEEVE

The sleeve 29 covers and is fitted to the outer periphery of the body portion 22c of the shank 22. The sleeve 29 has substantially a cylindrical shape and a little smaller diameter than that of the body portion 22c of the shank 22. A linear slit 30 is formed at the sleeve 29, extending in the axial direction thereof. The slit 30 allows the diameter of the sleeve 29 to be expanded or contracter. When the diameter of the sleeve 29 is made larger to fit and cover the body portion 22c, the elastic restoring force of the sleeve 29 makes itself closely fit the body portion 22c. Thus, the sleeve 29 is welded to the shank 22 without overlapping the slit 30 and the guide flutes 28.

Accordingly, when the sleeve 29 is fitted and fixed to the shank 22, a passage 50 is formed between the inner periphery of the sleeve 29 and the guide flutes 28 of the shank 22. The passage 50 leads the compressed air coming from the openings 8 to the cutting teeth 26.

MANUFACTURING OF THE SHANK 22

Manufacturing and assembly of the shank 22 and the sleeve 29 having the foregoing designs are described hereinafter. A cylindrical metallic material is prepared. The body portion 22c and the female thread 24 are formed on the material by means of a lathe. The notches 25 are formed by means of a milling machine. A plurality of (four in this case) inlet ports 27 are defined at predetermined positions by means of a drilling machine. The guide flutes 28 extending in the axial direction from the inlet ports 27 are formed with 0.4–0.5 mm depth by means of the milling machine. The the desirable shank 22 can be produced.

MANUFACTURING OF TE SLEEVE 29

A thin plate metallic material of about 0.5 mm is rolled, or the slit is formed on a thin metallic pipe in the axial direction thereof. Thus, the desirable sleeve 29 can be achieved.

ASSEMBLING THE SLEEVE 29 TO THE SHANK 22

The body portion 22c of the shank 22 is convered by the sleeve 29 without overlapping the slit 30 and the guide flutes 28. The sleeve 29 is fiexed to the shank 22 by means of spot welding to be integral therewith.

In order to form the passages 50, it is also possible to form similar guide flutes at the inner periphery of the sleeve 29 and thus form passages between the guide flutes and the outer periphery of the shank 22. However, when the passages are formed in this way, the guide flutes must be formed by means of broaching or drawing or the like. This type of processing would require extensive time and result in high production costs.

However, in the present embodiment as described above, the guide flutes 28 are formed on the outer periphery of the shank 22. Therefore, the passages 50 can be provided in the simple steps as explained above. Thus, the production cost can be lowered.

The openings 8 could also be formed at the proximal side of the adapter relative to the male thread 21. If the openings 8 are formed in such a way, the opening 5 and the groove 9 are separated from each other by the screwed portion of the adapter 1 and the shank 22. With this arrangement, a fluid passage for the compressed air 40 has to be provided between the openings 8 and the groove 9. Therefore, grooves crossing the male thread 21 and the female thread 24 must be provided. Forming these kind of grooves requires extra time.

In the present embodiment however, the openings 8 are disposed at the tip side of the adapter 1 relative to the male thread 21. Accordingly, a part of the male thread 21 and of the female thread 24 does not have to be processed to form the grooves, resulting in a simple production procedure.

In order to assemble the sleeve 29 to the shank 22, it is also possible to utilize the sleeve 29 having a diameter larger than that of the shank 22 without the slit 30 and to fix such sleeve 29 to the shank 22 by means of shrinkage fitting or spot welding. However, in this way, it is difficult to accurately form passages at predetermined positions between the sleeve 29 and the shank 22. Moreover, it is possible to form the sleeve with a plurality of segments having guide flutes and to fix these segments to the outer periphery of the shank 22. However, it requires a large number of parts and a complicated assembling procedure.

In the present embodiment, the sleeve 29 has a diameter smaller than that of the shank 22 and includes a slit 30 thereon, so that the elastic restoring force of the sleeve 29 itself makes the sleeve 29 closely fit the shank 22, Thus, the only requirement for assembling the shank 22 and the sleeve 29 in this embodiment is to cover the shank 22 with the sleeve 29 and to fix them together by means of spot welding. It is very simple and still can form the passages 50 of the desirable shape and location between the guide flutes 8 and the inner periphery of the sleeve 29. In addition, the sleeve 29 can be made of a single part and the manufacturing of the sleeve 29 is very simple and easy.

In the described drill arrangement of the present invention, the adapter 1, the shank 22 and the sleeve 29 and fixing of the sleeve 29 to the shank 22 can all be manufactured much more easily than the conventional drills. Consequently, the production cost of the drill can be lowered.

A method for drilling by using the foregoing drill is now described with reference to FIG. 1. Upon drilling, the drill is rotated by the motor 3 and the cutting teeth 26 are pressed against the concrete 51. The concrete 51 is cut by the cutting teeth 26 thereby generating debris 54 around the cutting teeth 26.

Then, compressed air 40 is supplied from the outside of the primary swivel joints 5 and the aspirator is driven to suck the air inside the drill out of the secondary swivel joint 16. Thus, the compressed air 40 goes through the drive shaft 4 of the motor 3, the tapped hole 2, the small bore holes 6, the openings 8 and the groove 9 to the inlet ports 27 of the shank 22. Then, the compressed air 40 passes through the passages 50 between the guide flutes 28 and the inner periphery of the sleeve 29 and is sprayed to the cutting teeth side At this time, the air in the shank 22 is sucked by the aspirator and the air pressure is decreased in the shank 22, so that the debris 54 together with the air outside the concrete 51 goes through the inside of the shank 22, the large bore hole 12, the openings 13, the secondary swivel joint 16 an the connector 17 into the suction pipe 18. Therefore, the debris 54 will not remain in the hole in the concrete 51 and is collected by the aspirator. Thus, the debris 54 does not obstruct drilling.

Upon drilling, when the cutting teeth 26 come to contact with the reinforcing bar 53 embedded in the concrete 51, silica sands 52 as granular abrasives are supplied to the drilling area from the outside of the drill. The silica sands 52 are composed of quartz sands including a large amount of silica ($SiO_2$), having transparent white color or gray color and a good abrasion resistance.

When drilling, a strong air stream occurs, going from the outside of the sleeve 29 to the inside of the shank 22 via the drilling hole. The silica sands 52 move together with the air stream. When the cutting teeth 26 cut the reinforcing bar 53, the silica sands 52 pass through the cutting teeth 26 led by the air stream. Thus, the silica sands 52 abrade the cutting teeth 26 to promote the self-sharpening effect of the cutting teeth 26.

Therefore, in the present embodiment, the drilling ability of the cutting teeth 26 can be always kept in a good condition by adding the silica sands 52, so that the reinforcing bars 53 can be easily cut.

Figure 6:
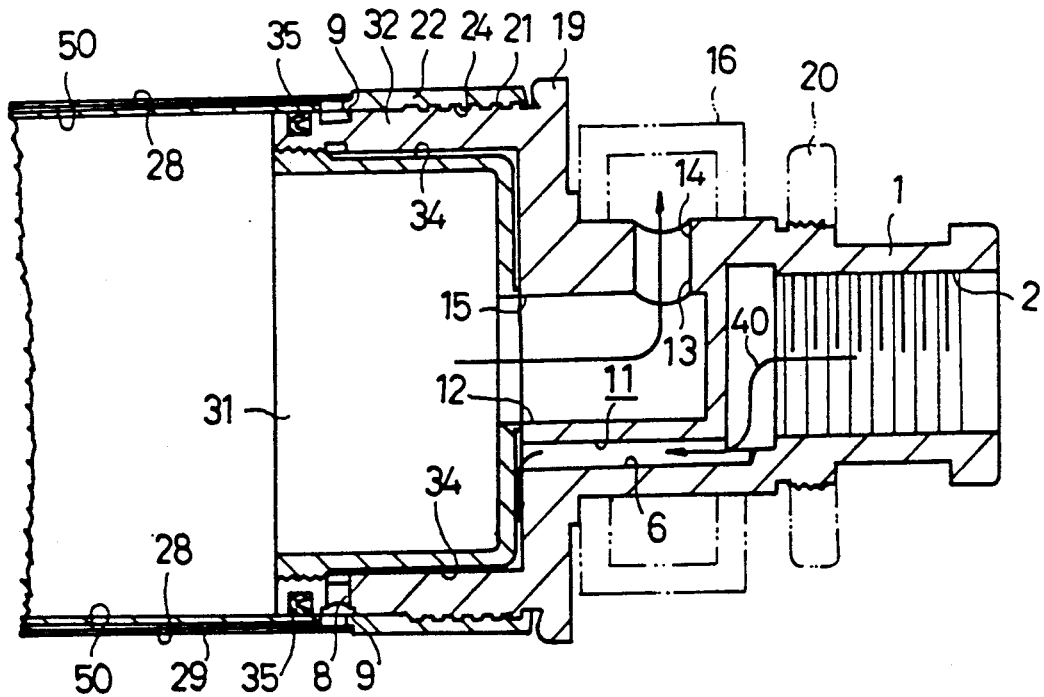
FIG. 6 is a partial sectional view of an adapter of another embodiment.

The shape of the adapter 1 can be modified as shown in FIG. 6 according to the diameters of the shank 22 and of the sleeve 29. The proximal portion (right side in FIG. 6) of the modified adapter 1 relative to the flange 19 has the same shape as that of the adapter 1 of the foregoing embodiment. However, the tip portion of the modified adapter 1 relative to the flange 19 is defined as a large diametrical portion 32. In addition, a substantially cylindrical auxiliary member 31 is fitted into the large diametrical portion 32. A passage 34 is disposed between the inner surface of the large diametrical portion 32 and the auxiliary member 31 so as to lead the compressed air 40 from the small bore hole 6 to the openings 8.

In this way, the present embodiment can have the same operations and effects as the foregoing embodiment, and the secondary swivel joint 16 can also be used in the present embodiment without modification. The added weight due to the auxiliary member 31 can be very little, too.

As the fluid, the liquid can be used. In this case, the pressure of the liquid can discharge the debris, so that the suction by the aspirator is not necessary. Moreover, the any number of the small bore holes 6, the openings 8 and 13, the inlet ports 27, the guide flutes 28 and the cutting teeth 25 may be changed to any appropriate number.

Instead of the O-ring 23 used in the foregoing embodiment, a V-ring 35 shown in FIG. 6 can be used. The drill and the method for using the same can be used for drilling rock or the like.

As the abrasives 52, diamonds, corundum ($Al_2O_3$), emery, garnet, flint, silicon carbide, boron carbide, chromium oxide, iron oxide or the like can be impregnated into the cutting teeth 26. It is desirable to choose the proper hardness and granular size of the abrasives according to the materials of the cutting teeth 26.

In addition, a plurality of cutting teeth can be disposed at the tip of the sleeve 29 instead of at the tip of the shank 22. Although only a few embodiments of the present invention have been described herein, it should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope of the appended claims.

What is claimed is:

1. A drill having a plurality of cutting teeth for drilling into a hard material, the drill comprising:
   a rotatable adapter connected to and rotatable with a drive means, the adapter including a groove on an outer periphery thereof, a fluid supply line for delivering a fluid to the groove from a proximal side of the adapter, an exhaust passage for receivng debris generated during cutting and an exhaust port for discharging the debris received;
   a shank attached to the adapter, the shank having an inlet port at a proximal end thereof that communicates with said groove;
   a sleeve journaled about and fixed to the shank; and
   a guide flute provided at an outer periphery of the shank and extending from the inlet port to a tip of the shank, said flute defining a passage between the shank and the sleeve, said passage leading the fluid introduced from the inlet port to the tip of the shank so as to spray the fluid onto debris generated during cutting.

2. A drill as set forth in claim 1 wherein said guide flute comprises an integral portion of the outer periphery of the shank.

3. A drill as set forth in claim 1 wherein the proximal end of the shank is screwed into a distal end of the adapter, the groove is provided at the outer periphery of the adapter at a position located on the distal side of the screwed portion, and the fluid supply line opens into the groove.

4. A drill as set forth in claim 1 wherein said sleeve has a diameter smaller than that of the shank before assembling, and a slit is formed on the sleeve and extends in the axial direction thereof.

5. A drill as set forth in claim 4 wherein said sleeve comprises a rolled plate material.

6. A drill a set forth in claim 4 wherein said sleeve covers the shank and is welded to the shank at the slit.

7. A drill as set forth in claim 1 further comprising a substantially cylindrical auxiliary member attached to the adapter, and an auxiliary passage defined between the adapter and the auxiliary member for leading the fluid to the groove provided on the outer periphery of the adapter.

* * * * *

UNITED STATES PATENT AND TRADEMARK OFFICE
CERTIFICATE OF CORRECTION

PATENT NO. : 5,092,716
DATED : March 3, 1992
INVENTOR(S) : Shohei Omi

It is certified that error appears in the above-identified patent and that said Letters Patent is hereby corrected as shown below:

Column 1, Line 7, Cancel "drillign" and insert --drilling--;

Column 1, Line 42, Cancel "drill" and insert --drills--;

Column 1, Line 58, Cancel "sharpneing" and insert --sharpening--;

Column 1, Line 64, Cancel "drill" in the first occurrence;

Column 2, Line 8, Cancel "adapter" and insert --adaptor--;

Column 2, Line 38, Cancel "particularly" and insert --particularity--;

Column 2, Line 54, Cancel "with";

Column 3, Line 4, Cancel "a";

Column 3, Line 15, Cancel "throught" and insert --through--;

Column 3, Line 44, Cancel "opening" and insert --openings--;

UNITED STATES PATENT AND TRADEMARK OFFICE
CERTIFICATE OF CORRECTION

PATENT NO. : 5,092,716

DATED : March 3, 1992

INVENTOR(S) : Shohei Omi

It is certified that error appears in the above-identified patent and that said Letters Patent is hereby corrected as shown below:

| | |
|---|---|
| Column 3, Line 47, | Cancel "an" and insert --and--; |
| Column 3, Line 59, | Cancel "engaged" and insert --engaged--; |
| Column 3, Line 61, | Cancel "opening" and insert --openings--; |
| Column 4, Line 38, | Cancel "contracer" and insert --contracted--; |
| Column 4, Line 61, | Cancel "the" in the second occurrence; |
| Column 4, Line 63, | In the subtitle "MANUFACTURING OF TE SLEEVE", cancel "TE" and insert --THE--; |
| Column 5, Line 6, | Cancel "fiexed" and insert --fixed--; |
| Column 5, Line 24, | Cancel "5" and insert --8--; |
| Column 5, Line 54, | After "22" cancel the comma (,) and insert a period (.); |

UNITED STATES PATENT AND TRADEMARK OFFICE
CERTIFICATE OF CORRECTION

PATENT NO. : 5,092,716
DATED : March 3, 1992
INVENTOR(S) : Shohei Omi

It is certified that error appears in the above-identified patent and that said Letters Patent is hereby corrected as shown below:

Column 5, Line 59, Cancel "8" and insert --28--;

Column 6, Line 8, Cancel "joints" and insert --joint--;

Column 6, Line 16, After "side" insert a period (,);

Column 6, Line 23, Cancel "an" and insert --and--;

Column 6, Line 26, Cancel "to" and insert --into--;

Column 7, Line 1, Cancel "any";

Column 7, Line 3, Cancel "25" and insert --26--.

Signed and Sealed this

Seventeenth Day of August, 1993

BRUCE LEHMAN

*Attest:*

*Attesting Officer*  *Commissioner of Patents and Trademarks*